United States Patent [19]
DeCloux

[11] Patent Number: 5,983,751
[45] Date of Patent: Nov. 16, 1999

[54] SINGLE GEAR TRAIN BICYCLE DRIVE MECHANISM

[76] Inventor: Richard Joseph DeCloux, 1485 Belmont St., Manchester, N.H. 03104

[21] Appl. No.: 08/918,341

[22] Filed: Aug. 26, 1997

[51] Int. Cl.$^6$ .............................. G05G 1/14; B62M 1/02
[52] U.S. Cl. .......................... 74/594.2; 74/435; 74/437; 280/260
[58] Field of Search .................. 74/435, 437, 594.2; 280/260

[56] References Cited

U.S. PATENT DOCUMENTS

| 844,210 | 2/1907 | Strickland | 74/437 |
|---|---|---|---|
| 2,131,288 | 9/1938 | Kirkpatrick | 74/437 |
| 4,261,223 | 4/1981 | Johnson | 74/437 X |

FOREIGN PATENT DOCUMENTS

| 350848 | 6/1905 | France | 74/437 |
|---|---|---|---|
| 1462219 | 5/1990 | Russian Federation | 74/437 |

*Primary Examiner*—Allan D. Herrmann

[57] ABSTRACT

Apparatus to drive a bicycle wherein two pedals move in a non-fixed, non-180 degree relationship to each other. As the pedal that is being powered by the user moves through an arc less than 180 degrees, the unpowered pedal moves through more than 180 degrees to a point where it is in a favorable position to be powered by the user. Two different systems are disclosed, each producing the desired relative pedal motion. The first and preferred system describes the use of non-circular gears. The second system describes the use of circular gears with sections of teeth removed.

3 Claims, 11 Drawing Sheets

2" Pitch Dia.
24 Teeth (12 D.P.)
Keyway On ¢ Of Valley

Fig. 5C

3" Pitch Dia.
36 Teeth (12 D.P.)
Keyway On ¢ Of Valley

SINGLE GEAR TRAIN BICYCLE DRIVE MECHANISM

FIELD OF USE

This invention relates to bicycle drive mechanisms and more particularly to mechanisms where the pedals move in relationship to each other as each rotates through its 360 degrees cycle.

RELATED ART

Related art for methods of making the propelling of a bicycle more favorable is extensive. Most notable are those mechanisms that change the effective length of the pedal crank arms during appropriate portions of the pedaling cycle: oval chain sprockets, Houdille Industries Inc. PowerCam, etc. Johnson U.S. Pat. No. 4,261,223; Kirkpatrick U.S. Pat. No. 2,131,288; Naza (Russia) 1,462,219; and Lemaire (France) 350,848 teach the application of elliptical gear to change effective crank arm length during the pedaling cycle. There are also various mechanisms where the pedal crank arms reciprocate rather than rotate, thereby slaying in a more favorable portion of the pedaling cycle: in come embodiments with the pedal crank arms reciprocating in relation to each other and in other embodiments with the pedal crank arms acting independently: Creative Motions Industries Inc. model CM 1000 bicycle, etc. Strickland 844,210 teaches the user of elliptical gears to transfer power at a varying-speed ratio. However, other than 4,477,012 DeCloux, there seems to be no other art that teaches the benefits and means of driving a bicycle with a mechanism that moves the two pedal crank arms in relation to each other as each rotates through its 360 degree cycle. That prior art for obtaining desirable pedal crank arm relative movement during rotational pedaling teaches a complicated apparatus requiring clutches, switches, cams, controllers, electric power supplies, etc. Not only does the complexity of that approach yield a high product cost and low product reliability, it effectively limits its, application to stationary use by its size, weight and power requirement.

SUMMARY OF INVENTION

It is an objective of the subject invention to provide a means of achieving desirable pedal crank arm relative movement during rotational bicycle pedaling that would be relatively inexpensive, light, reliable, and with no requirement for electric power. The invention accomplishes this objective through the use of a unique simple single gear train employing only four gears. The gear train is comprised of two co-linear, independent axles each with a pedal crank arm attached to the outer end and a gear attached to the inner end, plus a third axle with a gear on each end meshing with each of the gears on the respective independent axles so as to relate the movement of each independent axle to the other. In the first, preferred, embodiment the four gears are non-circular and identical. In a second embodiment, the gears are an assortment of compound circular gears. A gearbox provides positioning or the gear train components and is incorporated into either a moving or stationary bicycle in the same manner as the housing for a standard crankset. The user employs the subject mechanism in the same pedaling fashion as with the conventional 'fixed' crankset, while enjoying the subject mechanism's benefit of being able to apply more power due to always having one pedal in the most favorable portion of its movement circle.

BRIEF DESCRIPTION OF THE DRAWINGS

These and other features of the subject invention will he better understood in connection within the detailed description taken in conjunction with the drawings of which:

FIG. 2A is a plan view of the non-circular gear apparatus.

FIG. 2B is a sectional view 2B—2B of FIG. 2A showing one half of the non-circular gear gear train.

FIG. 2C is a sectional view 2C—2C of FIG. 2A showing the other half of the non-circular gear gear train.

FIG. 4A in a plan view of the compound gear apparatus.

FIGS. 5A, B, C, D are illustrations of a typical set of gears used in the compound gear embodiment of a single gear train mechanism to obtain the pedal crank arm movement described in FIGS. 1A & B.

DETAILED DESCRIPTION

Figure 1A:
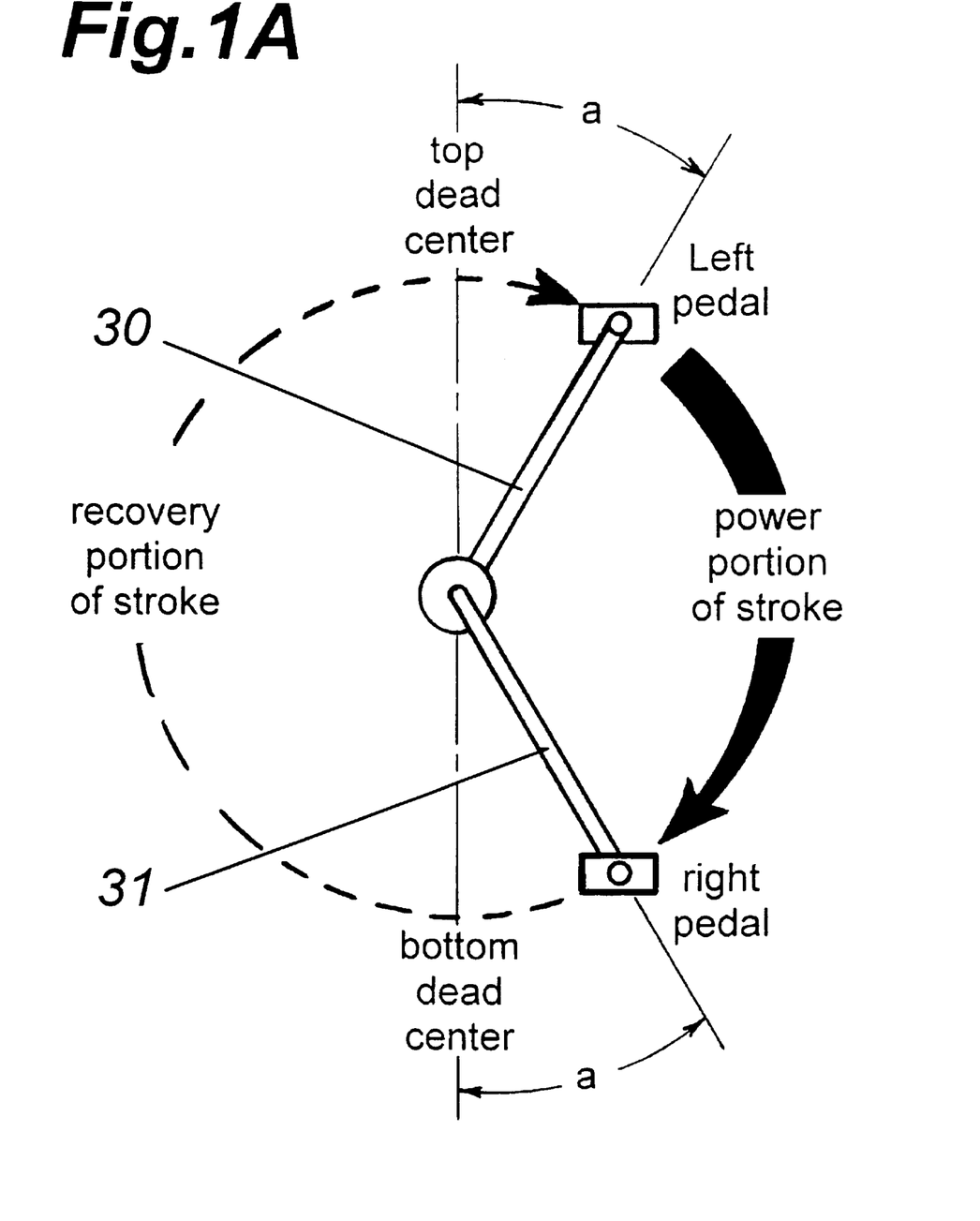
FIG. 1A is a diagram showing the desired relative movement of the two pedal crank arms as they alternate between driving and being driven.
Figure 1B:
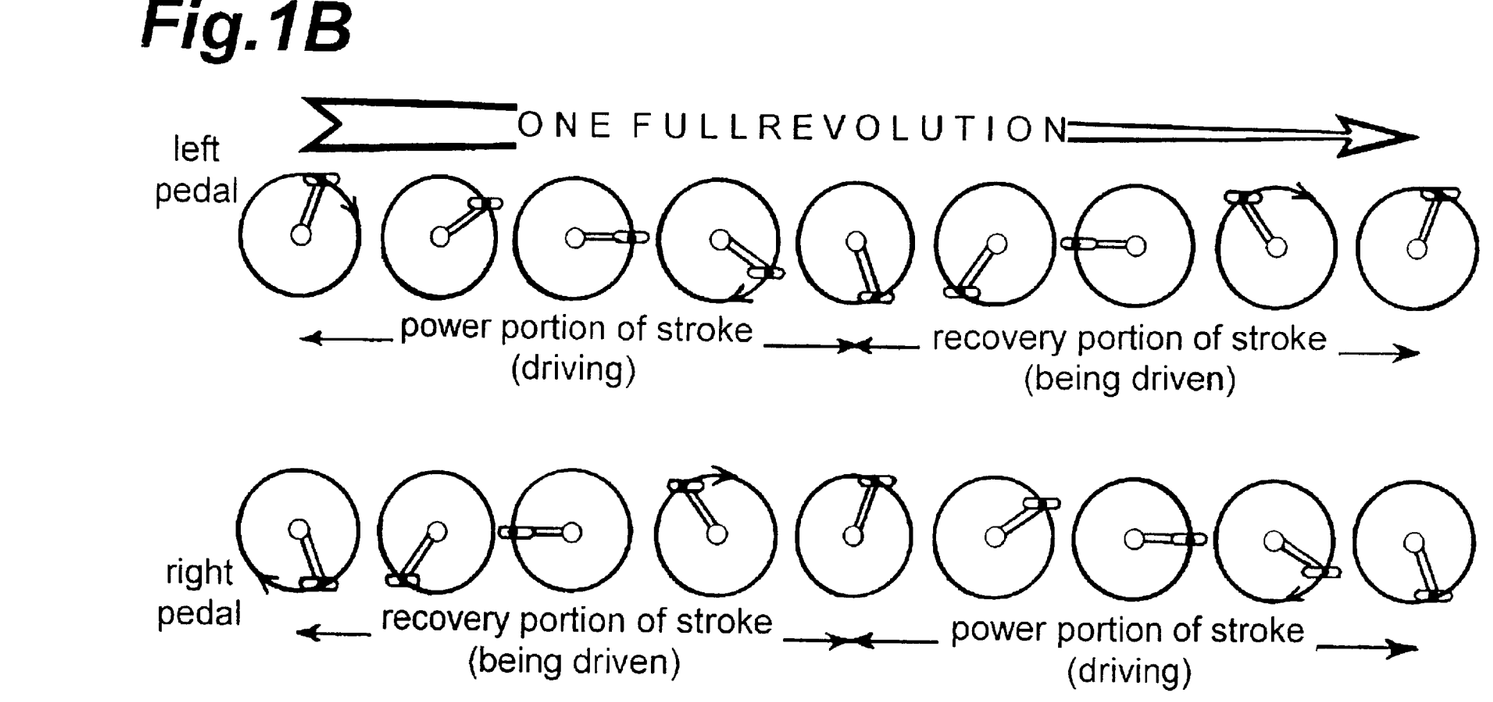
FIG. 1B is a diagram detailing the movement described in summary by FIG. 1A

A simple, single gear train bicycle drive mechanism provides a relatively inexpensive and reliable mechanism wherein the pedal crank arms move in a desirable non-fixed, non-180 degree relationship with each other. As illustrated in FIG. 1A and FIG. 1B, one pedal crank arm is always in the power portion of the stroke which is the segment of the pedaling circuit in which the user can apply the most force. FIG. 1B. further shows that the pedal crank arms 30 and 31 do not go through top and bottom dead center at the same time.

NON-CIRCULAR GEAR SYSTEM

Figure 2A:
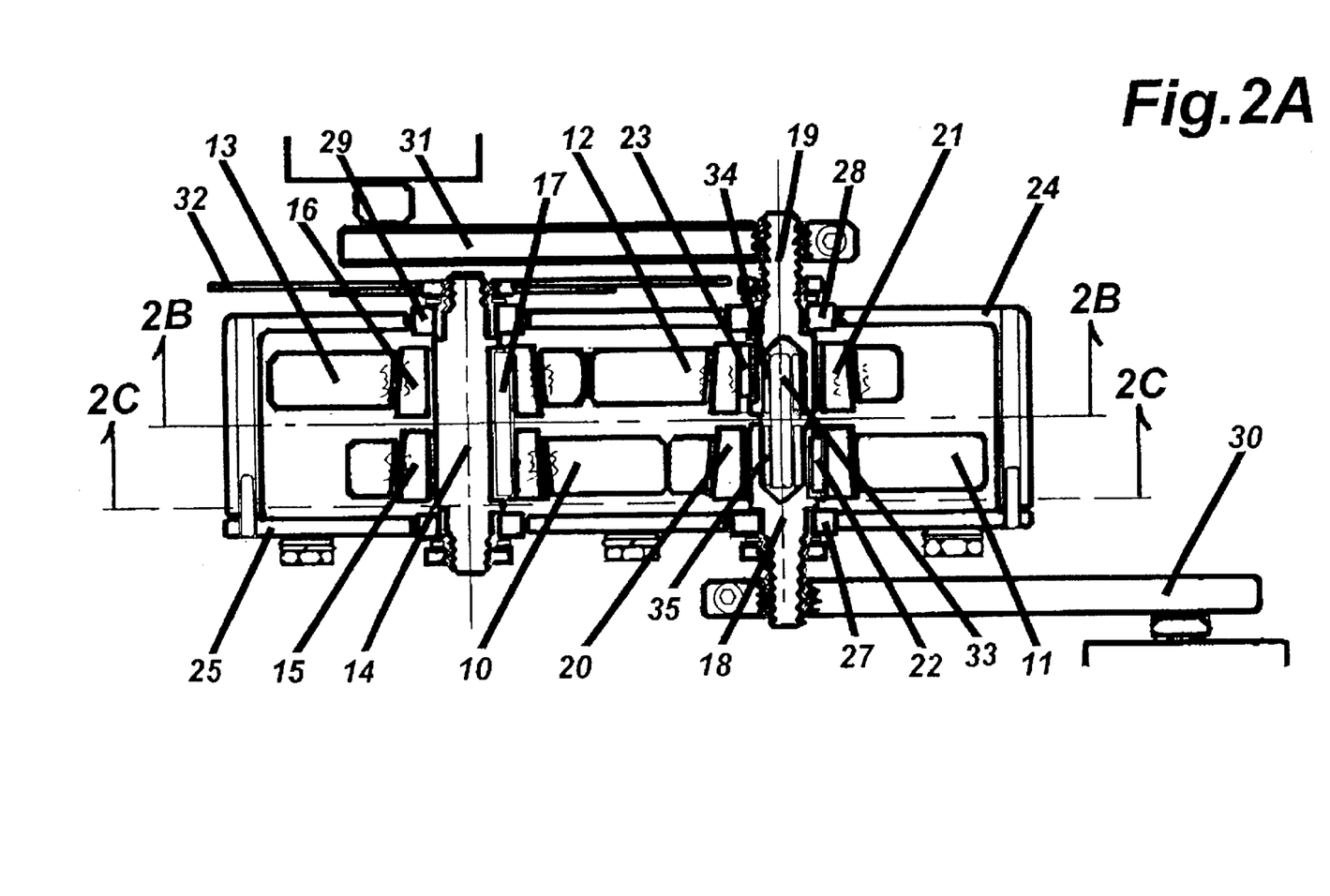
FIGS. 2A, B, C are a series of illustrations depicting sections of a non-circular gear embodiment of a single gear train mechanism to obtain the pedal crank arm movement described in FIGS. 1A & B.
Figure 2B:
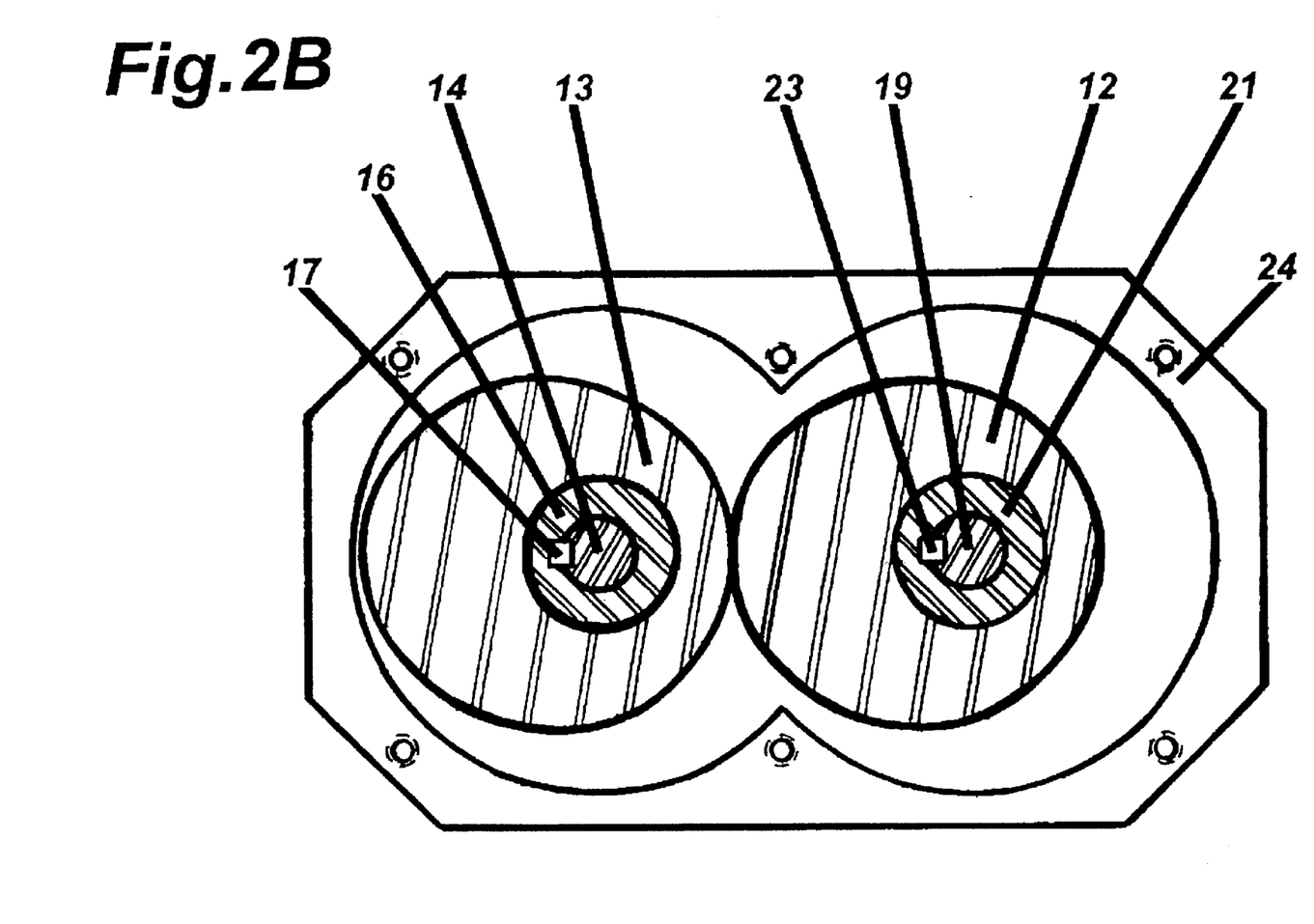
Figure 2C:
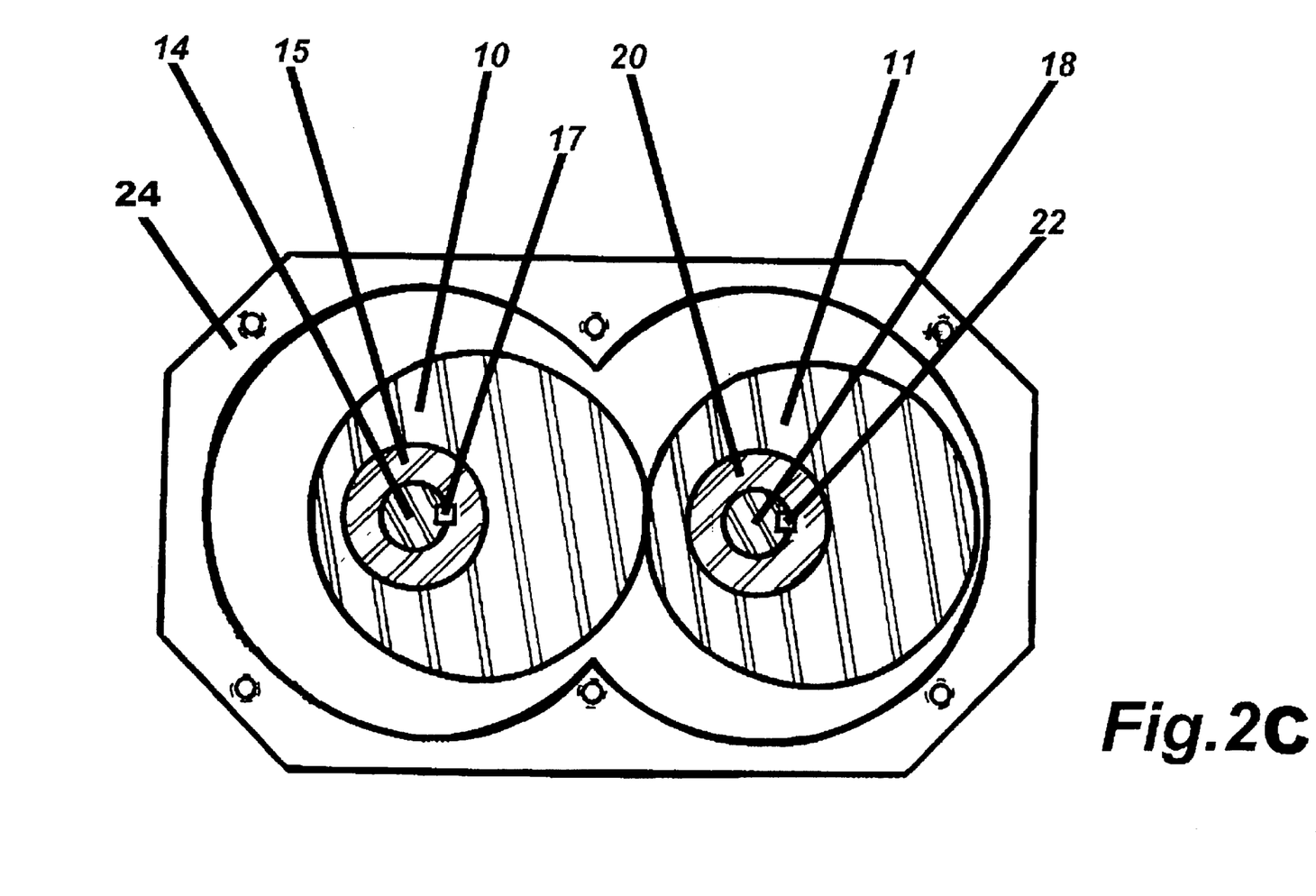

Referring now to FIGS. 2A, B, and C, diagrams provided to illustrate the preferred embodiment of the subject invention in which a train of non-circular gears cause one pedal crank arm to rotate through an angle greater than 180 degrees powered by the other pedal crank arm rotating through an angle less than 180 degrees. The gear train is comprised of four non-circular gears 10, 11, 12, 13; two of which 10 and 13 are mounted in a 180 degree relationship to each other on transfer axle 14 by bushings 15 and 16 and key 17. Each of the other two non-circular gears 11 and 12 are mounted respectively to the inner ends of independent crank axles 18 and 19 by bushings 20 and 21 and keys 22 and 23 respectively. The gear and axle assemblies are positioned and supported by gear box 24 and gear box cover 25 with bearings 26, 27, 28 and 29. Pedal crank arms 30 and 31 provide a means by which user inputs power and are attached respectively to the outlet ends of each of the independent crank axles 16 and 19. The drive mechanism puts power out through the chain sprocket 32 which is attached to one end of transfer axle 14.

Figure 3:
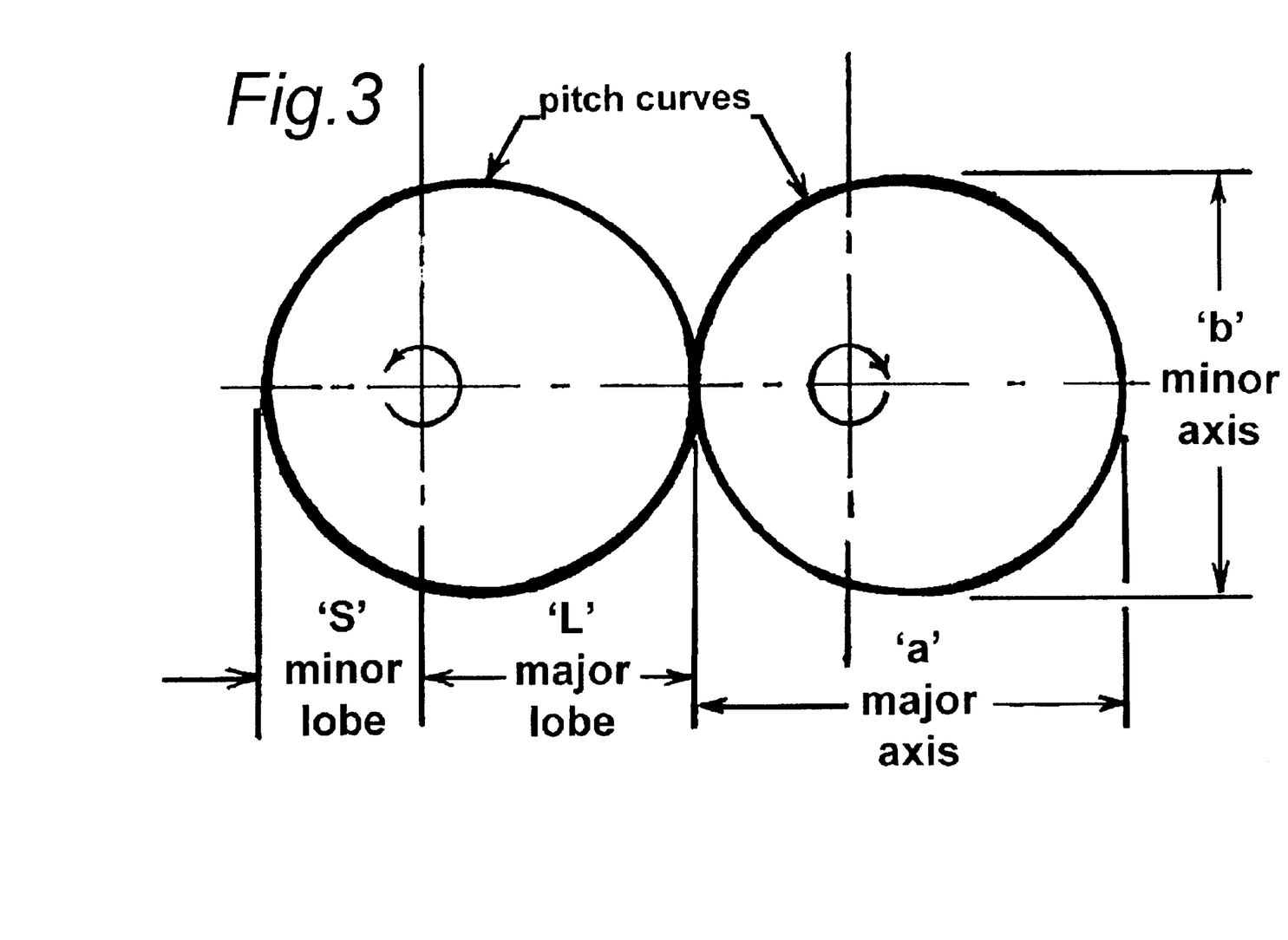
FIG. 3 is a general description of a non-circular gear.

It is required that:

when the gear train is assembled into the gear box, the major axes of non-circular gears 11 and 12 on the independent crank axles 18 and 19 must be at 180 degrees to the major axes of the gears 10 and 13 on the transfer axle 14 with which they mesh.

when the pedal crank arms 30 and 31 are attached respectively to the independent crank axles 18 and 19, the crank arms must be attached parallel to the major axis of the non-circular gear on that axle, and extending on the same side of the axle as the minor lobe, as shown in FIG. 3.

The basic specification of a non-circular gear is illustrated by FIG. 3. All four gears 10, 11, 12, 13, can be identical.

Within the strictures of non-circular gear design dealing with such issues as gear diameter, the need for whole numbers of teeth, meshing requirements, etc., and the requirement of this drive system that the sum of the angular 'power portion' of stroke' for each pedal crank arm plus the angular 'recovery portion of stroke' of the other equals 360 degrees, a range of angles of 'power portion of stroke' can be obtained by varying 'K'. When the ratio (K) of the size of the major lobe (L) to the size of the minor lobe (S) is 1.732, the 'a' angle in FIG. 1A will be approximately 30 degrees. It is to be noted that:

non-circular gears are produced by thirty three companies listed in Thomas Register. These companies can design individual gears to essentially match desired ratios between the angles of the 'power portion stroke' to the 'recovery portion of stroke' yielding a range of angle 'a' as shown in FIG. 1A.

the rotation of the output of this embodiment is opposite to the rotation of the input.

in this embodiment the cantilevered crank axles 18,19 are given additional support by pin 33 and bushings 34 and 35.

the non-circular gears provide a smooth transition from the 'power portion of stroke' to the 'recovery portion of stroke'.

the speed of the pedal crank arm 30 or 31 during the 'recovery portion of stroke' (in relation to the speed of the other pedal crank arm moving through the 'power portion of stroke') increases as it nears the middle of the 'recovery portion of stroke' (ref. FIG. 1B) and decreases as it moves beyond that mid-point.

power is delivered out of the subject mechanism through a chain sprocket 32 which in this embodiment is attached to the transfer 14 axle because that axle has a more even rate of rotation throughout the pedaling cycle compared to the independent crank axles. The chain sprocket 32 attached to the transfer axle 14 is limited in diameter by the pedal crank arm on that side of the mechanism.

Alternatively, chain sprocket 32 could be attached to one of the crank axles 18 or 19 so that it would output power in the same direction of rotation as the pedaling rotation and have no limitation on chain sprocket diameter. However, in that position the variation between maximum and minimum leverage of the user's effort during pedaling is about double the variation of leverage when the chain sprocket is attached to the transfer axle.

COMPOUND GEAR SYSTEM

This second embodiment of the subject invention is identical in concept with the first except that it uses compound circular gears in place of the non-circular gears of the first embodiment. The mechanism of this second embodiment, like the first, causes one pedal crank arm to rotate through an angle greater than 180 degrees powered by the other pedal crank arm rotating through an angle less than 180 degrees by use of a simple, single gear train. However, the pedal crank arms in this second embodiment have two distinct and constant rates of relative motion, as opposed to the ever changing rate of relative motion between the pedal crank arms in the first embodiment. In comparing maximum crank arm speeds during recovery stroke for the first and second embodiments where they each have the same speed during the power stroke, it in; significant that the circular gear second embodiment will have a lower maximum crank arm speed during the recovery stroke than the non-circular gear first embodiment. In a further comparison to the first embodiment where the four gears employed can be identical, the four gears of the second embodiment are made up of two sets of two different compound gears with a total of four different gear elements.

Figure 4A:
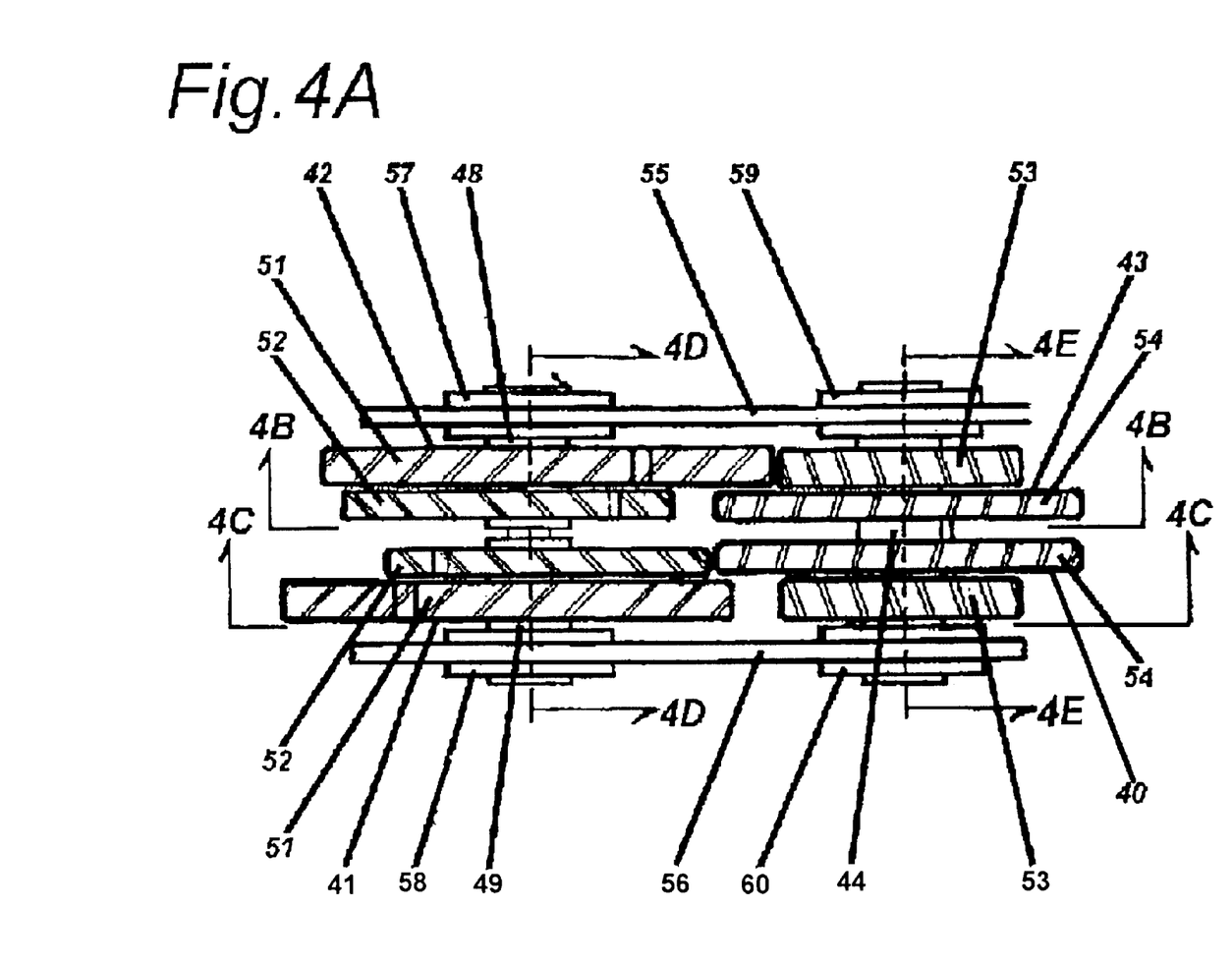
FIGS. 4A, B, C, D, are a series of illustrations depicting sections of a compound gear embodiment of a single gear train mechanism to obtain the pedal crank arm movement described in FIGS. 1A & B.

Referring now to FIGS. 4A, B, C, D and E, diagrams provided to illustrate a second embodiment of the subject invention. The gear train is comprised of two compound crank gears 41 and 42 mounted respectively to the inner ends of independent crank axles 49 and 48; and two compound transfer gears 40 and 43 on transfer axle 44. The gear, axle, and crank arm assemblies are positioned and supported by side plates 55 and 56 with bearings 57, 58, 59, and 60.

Figure 4B:
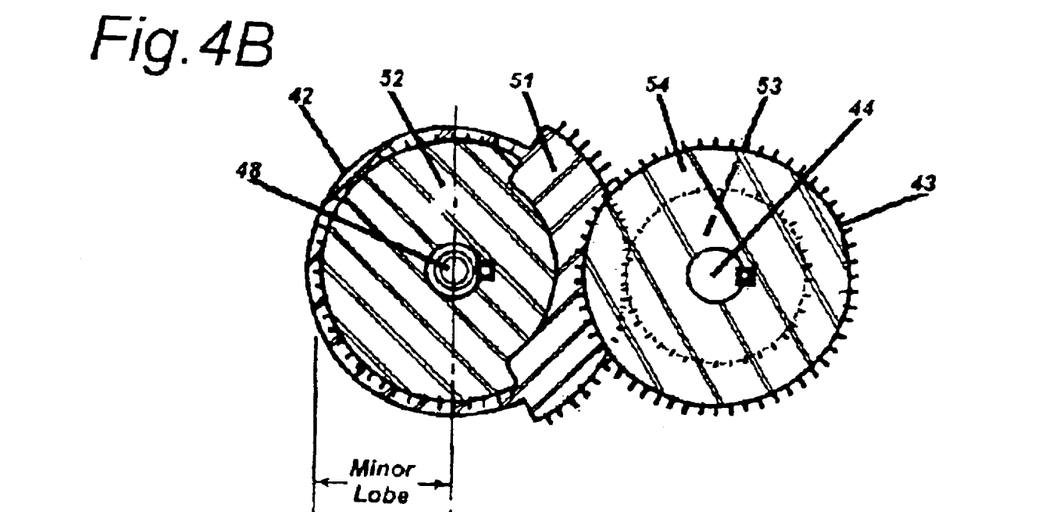
FIG. 4B is a sectional view 4B—4B of FIG. 4A showing one half of the compound gear train.
Figure 4C:
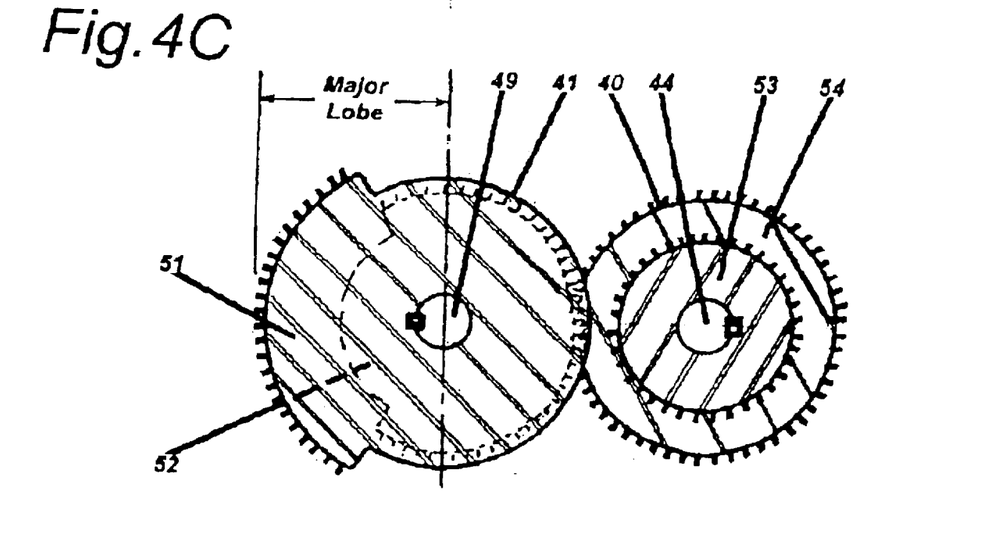
FIG. 4C is a sectional view 4C—4C of FIG. 4A showing the other half of the compound gear gear train.
Figure 4D:
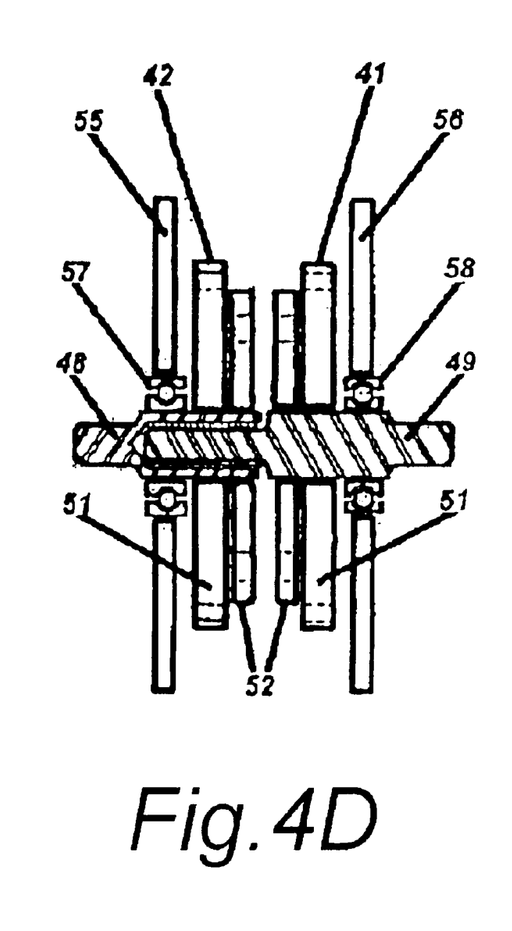
FIG. 4D is a sectional view 4D—4D of FIG. 4A showing a cross section through the independent axles and attached compound gears.
Figure 4E:
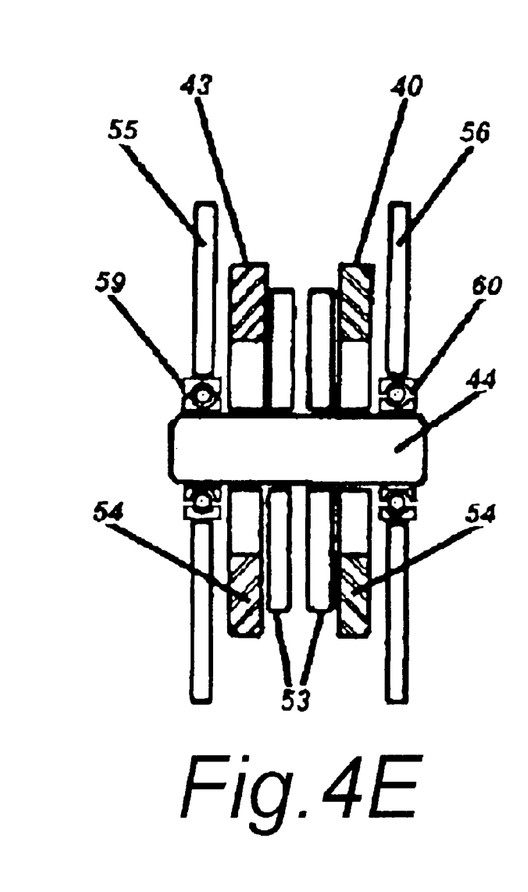
FIG. 4E is a sectional view 4E—4E of FIG. 4A showing a cross section through the transfer axle and attached compound gears.

Each of the crank gears 41 and 42 are made up of a large diameter segment 51 with teeth removed such that the remaining teeth present a major lobe, and a smaller diameter segment 52 with teeth removed such that the remaining teeth present a minor lobe (see FIGS. 4B and 4C). The transfer gears 40 and 43 have two sets of teeth each with pitch and diameter to mesh with those on the major and minor lobes of the crank gears 41 and 42.

Figure 5A:
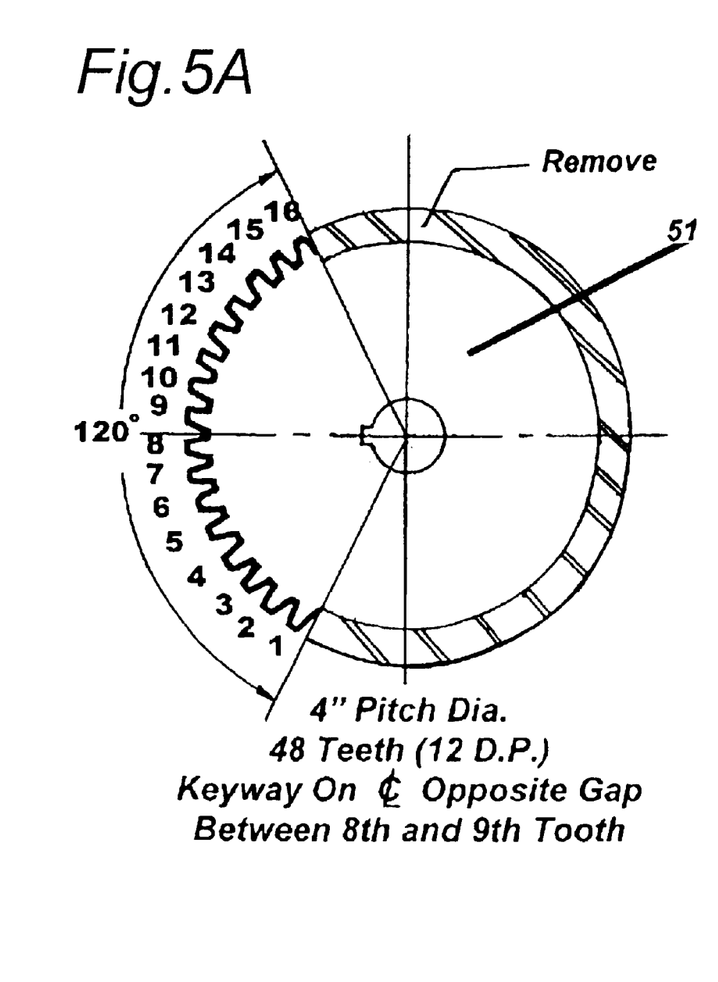
FIG. 5A is an illustration of the major lobe segment of a drive gear.
Figure 5B:
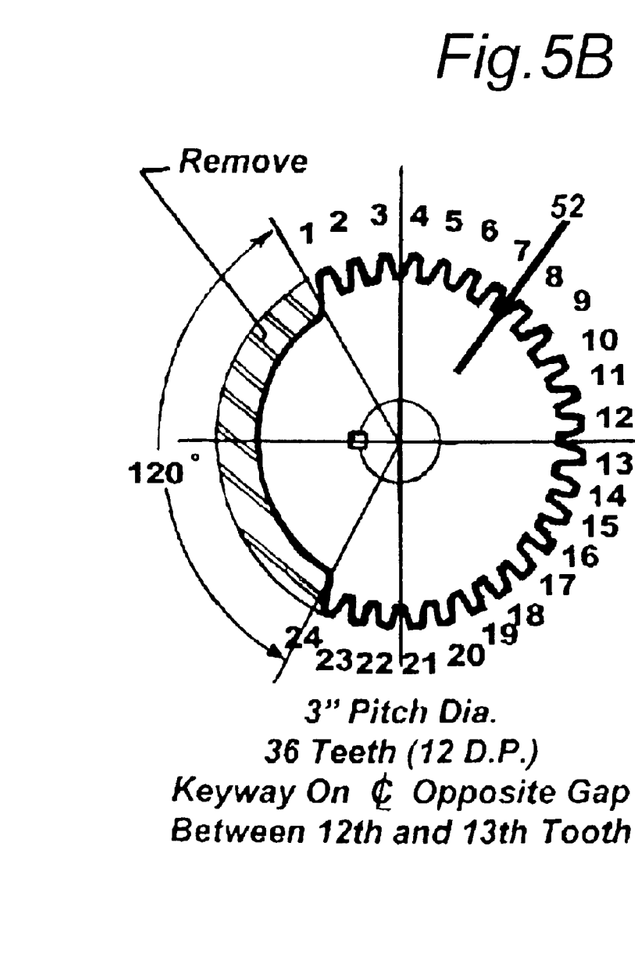
FIG. 5B is an illustration of the minor lobe segment of the drive gear.
Figure 5C:
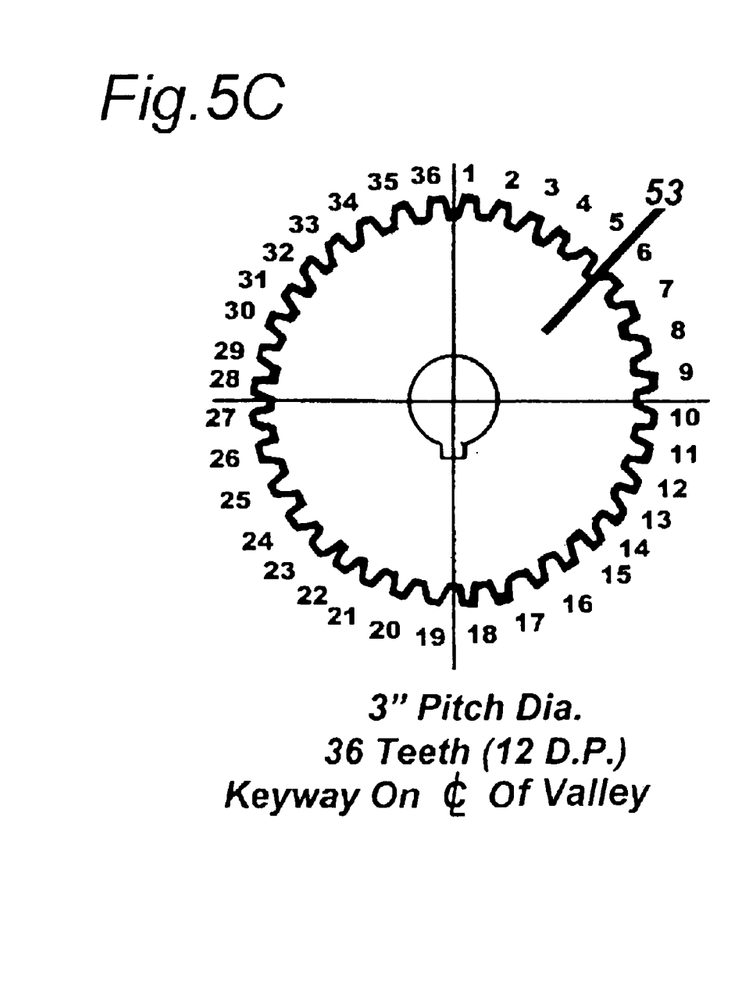
FIG. 5C is an illustration of the large diameter segment of the transfer gear.
Figure 5D:
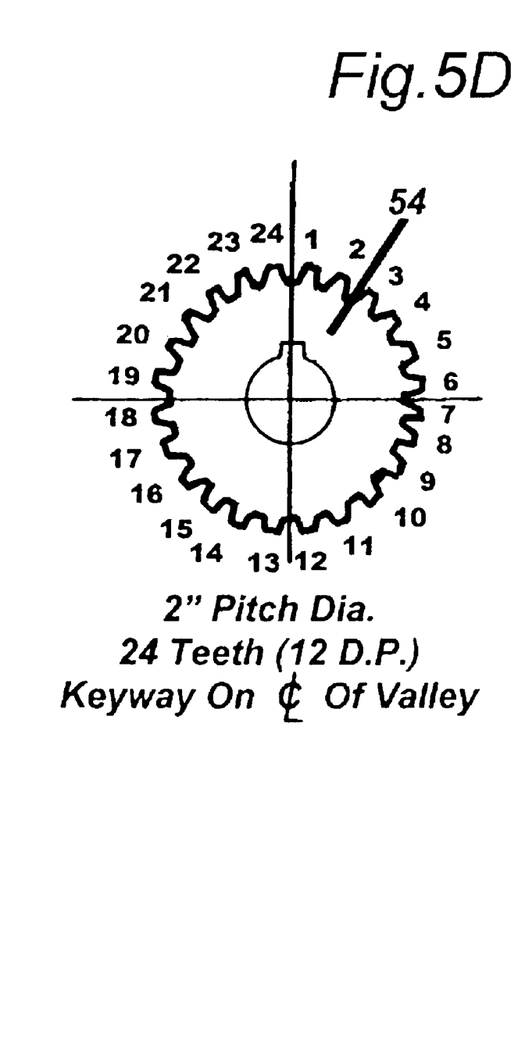
FIG. 5D. is an illustration of the small diameter segment of the transfer gear.

FIGS. 5A, B, C, D illustrate examples of gear elements 51, 52, 53, and 54, that, when combined, produce the compound gears that deliver one form of the desired relative motion of the pedal crank arms. Crank gears 41 and 42 are identical and are made up by joining gear elements 51 (see FIG. 5A) and 52 (see FIG. 5B). Transfer gears 40 and 43 are identical and are made up by joining gear elements 53 (see FIG. 5C) and 54 (see FIG. 5D). It is to be noted that:

the compound circular gears provide a distinct transition point between the 'power portion of stroke' and the 'recovery portion of stroke' (ref FIG. 1A).

crank arm speed during the 'recovery portion of stroke' is constant in relation to crank arm speed during the 'power portion of stroke' (ref. FIG. 1A).

the ratio between the angle of the 'power portion of stroke' and the angle of the 'recovery portion of stroke' as shown in FIG. 1A. will be the same as the ratio of the number of teeth on the major lobe to the number of teeth on the minor lobe of crank gears 41 and 42.

the number of teeth on each transfer gear elements 51 and 52 of the transfer gears 40 and 43 must be such that when they relate to the number of teeth on the meshing crank gear elements 52 and 53 such that they produce exactly one revolution of the transfer gears for each complete revolution of the compound crank gears 41 and 42.

FIG. 4 demonstrates two compound gears, each made from two of the gear elements typically shown in FIGS. 5A, 5B, 5C, and 5D. The pitch angle that positions each tooth in relation to the others must be exactly maintained between each element of each compound gear. Special care must be taken to ensure that the teeth adjacent to the points of transition from one diameter to the other maintain the appropriate pitch angle relationship.

(To avoid problems associated with assembling the two elements together accurately, the compound gears can be made from one blank; and, depending on segment diameters and pitch, made with both elements in the same plane.) The gear elements 51, 52, 53, and 54 described above can be made from standard catalog components. The critical alignment of one element to the other to form compound gears 40, 41, 42, and 43 depends upon the tolerances associated with machining their keyways, shaft keyways, and keys. The required tight tolerances can be achieved at a lower unit cost in volume manufacture bycasting or sintering the compound gears as a single component as opposed to keying together single modified standard gears.

While there have been described what are at present considered to be the preferred embodiments of this invention, it will be obvious to those skilled in the art that various changes and modifications may be made therein without departing from the invention and it is, therefore aimed to cover all such changes and modifications as fall within the true spirit and scope of the invention.

What is claimed is:

1. A bicycle drive mechanism that provides a non-fixed, non-180 degree relationship between two pedals as they rotate, comprising:

two non-circular gears mounted on a single axle, driving two non-circular gears each of which is mounted on separate axles, where the two gears mounted on the one axle are mounted to that axle with their major lobes at a 180 degree relationship to each other, and where the axles with single gears are positioned such that their gears mesh minor lobe to major lobe with the two gears on one axle, and the relative motion of the two axles with a single gear is determined by the ratio of the angles subtending the major and minor lobes; a support structure that positions the three axles and mounts the drive mechanism to a bicycle; means of attaching said pedals to the single gear axles; and means to transfer power from the mechanism to said bicycle.

2. A bicycle drive mechanism that provides a non-fixed, non-180 degree relationship between the two pedals as they rotate, comprising:

two compound gears mounted on a single axle, driving two compound gears each of which is mounted on separate axles; with each of the four compound gears being formed from two gear elements of differing diameters, wherein two of the compound gears have teeth missing from each of their two elements such as to form major and minor lobes where the angles subtended by the remaining teeth total 360 degrees and the ratio of subtended angles determine the desired relative movement of the two axles with single gears; a support structure that positions the three axles and mounts the drive mechanism to a bicycle; means of attaching said pedals to the single gear axles; and means to transfer power from the mechanism to said bicycle.

3. The apparatus of claim 2 wherein each of the compound gears is manufactured as a single piece.

\* \* \* \* \*